US008676783B1

(12) United States Patent
Fedorynski et al.

(10) Patent No.: US 8,676,783 B1
(45) Date of Patent: Mar. 18, 2014

(54) METHOD AND APPARATUS FOR MANAGING A BACKLOG OF PENDING URL CRAWLS

(75) Inventors: Pawel Aleksander Fedorynski, Menlo Park, CA (US); Sumitro Samaddar, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/170,890

(22) Filed: Jun. 28, 2011

(51) Int. Cl.
*G06F 17/30* (2006.01)
*G06F 7/00* (2006.01)

(52) U.S. Cl.
USPC .......................................................... 707/709

(58) Field of Classification Search
USPC .......................................................... 707/709
See application file for complete search history.

(56) References Cited

U.S. PATENT DOCUMENTS

| | | | | |
|---|---|---|---|---|
| 6,351,755 | B1 * | 2/2002 | Najork et al. | 715/206 |
| 7,305,610 | B1 * | 12/2007 | Dean et al. | 715/205 |
| 7,308,643 | B1 * | 12/2007 | Zhu et al. | 715/206 |
| 7,725,452 | B1 * | 5/2010 | Randall | 707/709 |
| 2007/0016907 | A1 * | 1/2007 | Benedetti et al. | 718/104 |
| 2009/0216708 | A1 * | 8/2009 | Madaan et al. | 707/2 |
| 2010/0057802 | A1 * | 3/2010 | McKeeth | 707/734 |
| 2010/0192157 | A1 * | 7/2010 | Jackson | 718/104 |

* cited by examiner

Primary Examiner — Kimberly Wilson (57) ABSTRACT

The technology described relates to reducing a backlog of pending URL crawls in view of a limited URL crawl capacity. This technology is useful for crawling URLs with low latency. Because of the limited crawl capacity, uncrawled URLs from crawl requests are entered into a backlog data structure of pending crawl requests. Various criteria are applied to the URL's that are requested to be crawled, so that less important URL crawls are rejected early from the backlog data structure. This early rejection tends to limit the backlog data structure to the more important pending URL crawls, and tends to keep the average latency low by quickly failing the less important requested URL crawls.

21 Claims, 3 Drawing Sheets

METHOD AND APPARATUS FOR MANAGING A BACKLOG OF PENDING URL CRAWLS

BACKGROUND

When crawling URLs on a network, a URL crawler imposes a limit on the crawling throughput for each host, as measured by a number of URL crawls allowed per unit of time. For example, the URL crawl capacity may be 10 URLs per second for the particular host(s) of the URL. This limit is motivated by the need to avoid putting excessive load on the host, as well as the desire to respect the URL host's explicitly stated preferences with regard to the available crawl capacity of the URL host for URL crawlers.

In the event that this crawl capacity limit is shared among several applications, any individual application is faced not only with limited crawl capacity (that may change with time) but also other applications competing for the same limited crawl capacity of various URLs at the same host at any given time. In this situation, the pending URL crawls from the competing applications wait, and the URL crawler takes pending URL crawls at a rate not exceeding the available crawling capacity. If an application's total crawling needs are not greater than the capacity available to this application, the application will have all its crawling demands eventually satisfied. However, if the application's crawling demands are more than the capacity available to this application, then as the application uses up all available crawling capacity, pending URL crawls at the tail of the queue remain uncrawled, regardless of the relative importance of the various pending URL crawls. It would be desirable to perform pending URL crawls with low latency for the more important URL crawls requested by applications.

SUMMARY

The technology described relates to reducing a backlog of pending URL crawls in view of a limited URL crawl capacity. This backlog is tracked using a backlog data structure such as a queue or FIFO maintained in memory. This technology is useful for crawling URLs with low latency. Because of the limited crawl capacity, incomplete URL crawls from crawl requests are entered into a backlog of pending crawl requests. Various criteria are applied to the requested URL crawls, so that less important URL crawls are rejected early from the backlog data structure. This early rejection tends to limit the backlog data structure to the more important pending URL crawls, and tends to keep the average latency low by quickly failing the less important requested URL crawls.

DETAILED DESCRIPTION

The disclosed technology apportions a limited URL crawl capacity among incoming URL crawl requests, especially when there is not enough capacity to satisfy all of the requests with acceptable latency. Applications that submit URL crawl requests to the URL crawler have a performance requirement that the requested URL crawls be performed with low latency, typically low average latency.

One approach prunes pending URL crawls from a queue after the pending URL crawl reaches a maximum time that it is allowed to spend in the backlog data structure. After the pending URL crawl passes its expiration time, the crawl attempt fails. This approach favors the URL crawl requests that reach the backlog when it is shortest, over URL crawl requests made when the backlog is substantial. This approach controls the size of the backlog but only after timeouts.

The technology disclosed predicts which requests would be likely to time out if added to the backlog or queue and rejects them without relying on timeouts. The requesting application assigns a priority to each URL requested to be crawled. A backlog manager uses this priority to help determine which requests to reject without relying on timeouts. When the crawl capacity is limited, the higher priority pending URL crawls are performed prior to the lower priority pending URL crawls. This may be implemented by sorting the backlog by priority. When the backlog data structure is a queue, a priority queue is sorted by priorities.

To further lower the average latency, the system may keep track of how long it would take for a newly added pending URL crawl to reach the front of the queue, and fail the request if this time is longer than the timeout value. There are a variety of implementations of such an early fail mechanism. Some implementations take into account the priority of a request, because it is possible that pending URL crawls in the backlog have lower priority than the priority of the new pending URL crawl It is useful to combine early rejection of a requested URL crawl from the backlog, and taking into account the priority of a particular requested URL crawl.

Figure 1:
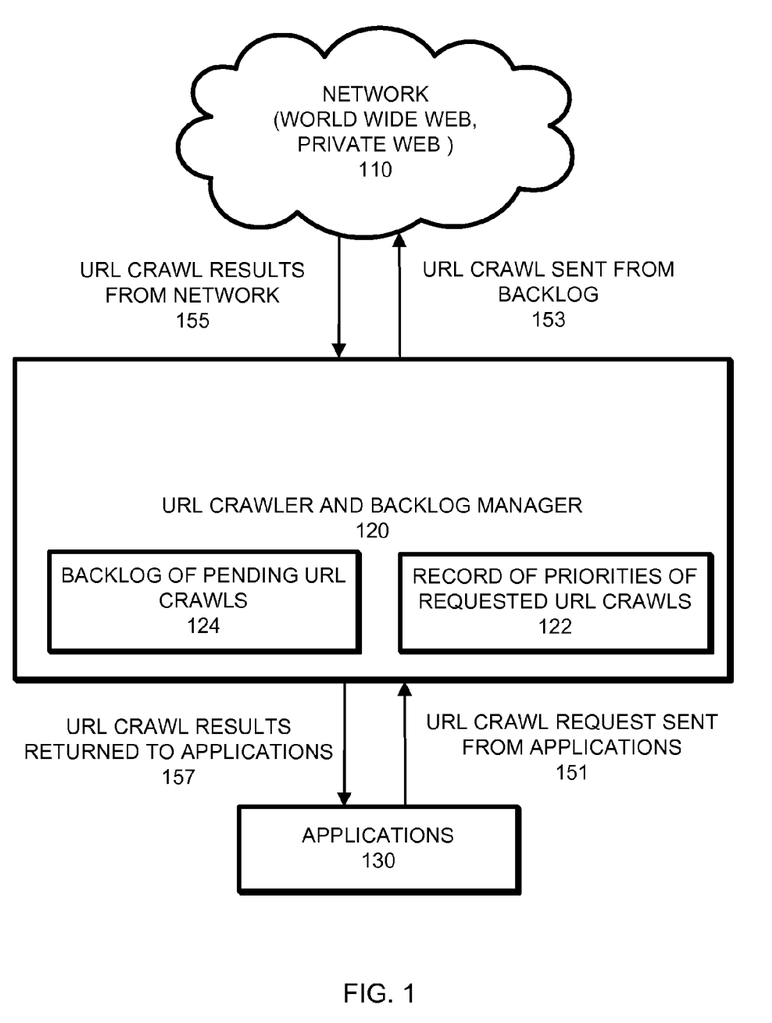
FIG. 1 is a high level block diagram of an example overall architecture, including a network with target URLs to be crawled, a URL crawler and backlog manager, and applications requesting the URL crawler to perform crawls.

FIG. 1 is a high level block diagram of an example overall architecture, including applications requesting the URL crawler to perform crawls, a network with target URLs to be crawled, and a URL crawler and backlog manager.

The URL crawler and backlog manager 120 receives URL crawl requests 151 from applications 130. As shown, the URL crawler and backlog manager 120 are combined. The URL crawler and backlog manager 120 are also separable into a URL crawler part and a backlog manager part. Whether separated or combined, the URL crawler part actually performs the URL crawls and communicates crawl results with the requesting application. Whether separated or combined, the backlog manager part works in tandem with the URL crawler part to handle the backlog 124 of pending URL crawls and the record of priorities 122.

The URL crawler and backlog manager 120 can take the URL crawl requests one by one. There also may be multiple URL crawl requests inflight. Throughput increases because when one crawl event does not have to return before sending another. A particular request may include just one requested URL to be crawled or multiple requested URL crawls to reduce overhead.

URL crawl requests that are not rejected are added to the backlog 124 of pending URL crawls. The backlog 124 contains the pending URLs to be crawled. The data structure of the backlog 124 can be a queue with the pending URL crawl requests sorted by priority. Other possible data structures for the backlog 124 are stacks, linked lists, search trees, etc. A pending URL crawl is added to this backlog 124 when a URL crawl is requested by an application 130, unless the rejection logic fails the pending URL crawl from the backlog 124.

Pending URL crawls are taken out from the backlog 124. A pending URL crawl that propagates to the front of the backlog 124 is removed from the queue and is actually crawled by the URL crawler. When the pending URL crawl exceeds the timeout period, or the maximum time allowed in the backlog 124, the pending URL crawl is removed and is not crawled by the URL crawler.

Whether a requested URL crawl is rejected from the backlog 124 is determined by the priority of the requested URL crawl. The sufficiency of the priority of the requested URL crawl is determined with the assistance of the URL crawl priority record 122.

A priority threshold is determined based on the priority values in the record 122. A priority threshold is compared against the priority of a requested URL crawl to determine whether to enter the requested URL crawl is entered into the backlog 124. When the priority of the requested URL crawl fails the priority threshold, the requested URL crawl is rejected from the backlog 124. When the priority of the requested URL crawl passes the priority threshold, the requested URL crawl is added to the backlog 124.

The priority threshold can be a priority value that is compared to the priority of a requested URL crawl. The priority threshold can also be expressed as an index value of a record 122. The index value identifies a particular priority stored in the record 122. This identified priority in the record 122 in turn is compared to the priority of a requested URL crawl. The priority threshold can also be expressed as a fraction of the record 122. This fraction corresponds to a particular priority stored in the record 122. For example, a fraction of 0.5 corresponds to a particular priority stored in the middle of a record 122 sorted by priority. The particular priority in turn is compared to the priority of a requested URL crawl.

The priority threshold is updated periodically. In one example, once a minute, and other periods are possible. The updates can also be event triggered.

The priority threshold is based on an estimate of a probability that a newly requested URL crawl will be satisfied. If the probability estimate is high that a newly requested URL crawl will be satisfied, then the priority threshold is relaxed such that it is easier for a newly requested URL crawl to be entered into the backlog 124. If the probability estimate is low that a newly requested URL crawl will be satisfied, then the priority threshold becomes more demanding such that it is more difficult for a newly requested URL crawl to be entered into the backlog 124.

The probability estimate relies on an estimate of the fraction of requested URL crawls that can be satisfied. The fraction of requested URL crawls that can be satisfied has as the numerator the average request interval, or the difference in time between arrival of URL crawl requests. This value is updated as URL crawls are requested.

The fraction of requested URL crawls that can be satisfied has as the denominator the average response interval. The average response interval is the difference in time between the return of different URL crawl results, and is indicative of throughput. As URL crawl throughput rises, the probability that a newly requested URL crawl will be satisfied rises. The average response interval is updated as URL crawls return from the network. In one example, request number 1 is sent at time 0.1 s, request number 2 is sent at time 0.2 s, request number 3 at is sent at time 3 s, request 4 is sent at time 0.4 s, etc. Request 1 returns at 1.1 s, request 2 returns at 1.2 s etc. In this example, the average response interval is 0.1 s. This can be different from the average completion time of particular requested URL crawls which is 1 second.

A rolling average is maintained for the average request interval and the average response interval. One example of calculating the rolling average weights newer values differently than older values. By favoring newer values, the rolling average is largely determined by the most recent history of URL crawls requested. By favoring older values, the rolling average takes greater account of the older URL crawl requests. The rolling average can also be a simple moving average, cumulative moving average, or weighted moving average.

The fraction of requested URL crawls that can be satisfied may be close to 1. Then the priority threshold is set sufficiently low such that no requested URL crawls are rejected from the backlog. This implements a preference to err on the side of using up all available crawl capacity. Maintaining a backlog with requested URL crawls is preferable to inadvertently failing to use up the crawl capacity. In one example, if the fraction of requested URL crawls that can be satisfied is 0.9 or more, the priority threshold is set to 0. Values of the fraction other than 0.9 or 90% can be selected.

The URL crawl priority record 122 stores priorities of requested URL crawls. This record 122 may be a queue or FIFO data structure. In addition to queues, other possible data structures are stacks, linked lists, search trees, etc.; the algorithm is adapted to the data structure. The actual URLs requested to be crawled are optional in this crawl priority record.

The stored priorities are from the recently requested URL crawls. The record 122 can store a number of priority values such as a constant N. A new element or priority is added to the record when a URL crawl is requested by an application. When the record has the number N of priority values, then older priority values are removed as newer priority values are added.

A priority can be in the record 122, without the corresponding pending URL crawl being in the backlog 124. The priorities stored in record 122 do not have to be limited to the priorities of requested URL crawls that are accepted into the backlog 124. When a requested URL crawl is rejected from the backlog 124, the priority of the rejected URL crawl is still entered into the priority record 122. The priority of the rejected URL crawl is in the priority record 122 though the corresponding URL crawl is absent from the backlog 124. The priorities of requested URL crawls that are rejected from the backlog 124 help indicate whether subsequent requested URL crawls have sufficient priority to be added to the backlog 124.

When a requested URL crawl is accepted into the backlog 124, the priority of the accepted URL crawl is entered into the priority record 122. However, a pending URL crawl can remain the backlog 124, without the corresponding priority remaining in the record 122. In one example, a pending URL crawl that reaches the front of the backlog 124 is removed from the backlog 124 and is actually crawled by the URL crawler. When the pending URL crawl is removed from the backlog 124, the priority of that removed pending URL crawl can remain in the record 122. In another example, when the pending URL crawl exceeds the timeout period, or the maximum time allowed in the backlog 124, the pending URL crawl is removed from the backlog 124 and is not crawled by the URL crawler. Though the pending URL crawl is removed from the backlog 124, the priority of that removed pending URL crawl can remain in the record 122. The priorities of requested URL crawls that are accepted into the backlog 124 and later removed from the backlog 124 help indicate whether subsequent requested URL crawls have sufficient priority to be added to the backlog 124.

URL crawls 153 are sent from the backlog of pending URL crawls 124 of the URL crawler and backlog manager 120. The URL crawls 153 are sent when pending URL crawls in the backlog 124 have a sufficiently high priority and enough crawl capacity is available. URL crawl results 155 are sent back from the network 110 to the URL crawler and backlog manager 120. Finally, the URL crawl results 157 are returned to the applications 130.

The network 110 being crawled is typically the World Wide Web, but can only also be a private web, or a combination. The network 110 has content identified by URL, or Uniform Resource Locator. A URL identifies the scheme or protocol (for example, http, https). A URL further identifies a domain name or IP address, and optionally file names with a file path at the domain name or IP address, a port number, and the query string. A system also can crawl keyed on URN (Uniform Resource Name) or URI (Uniform Resource Identifier).

Applications 130 are designed to process retrieved content from particular URLs of the network 110. Example applications 130 are various search engines, such as web/text search, image search, news aggregators, publication search, product search, video search, and search preview.

The applications 130 rely on a URL crawler and backlog manager 120 to retrieve content from the network 110. The URL crawler and backlog manager 120, in addition to accomplishing the mechanics of retrieving the content, allocates a limited crawl capacity among the applications 130. The applications 130 indicate the relative importance of a particular pending URL crawl with a priority score. The priority can be higher based on popularity of the content or IP address/domain name, and the importance of maintaining the freshness of the rapidly changing content such as breaking news. Because crawl capacity is a scarce resource, crawl capacity is conserved with the priority scores.

Figure 2:
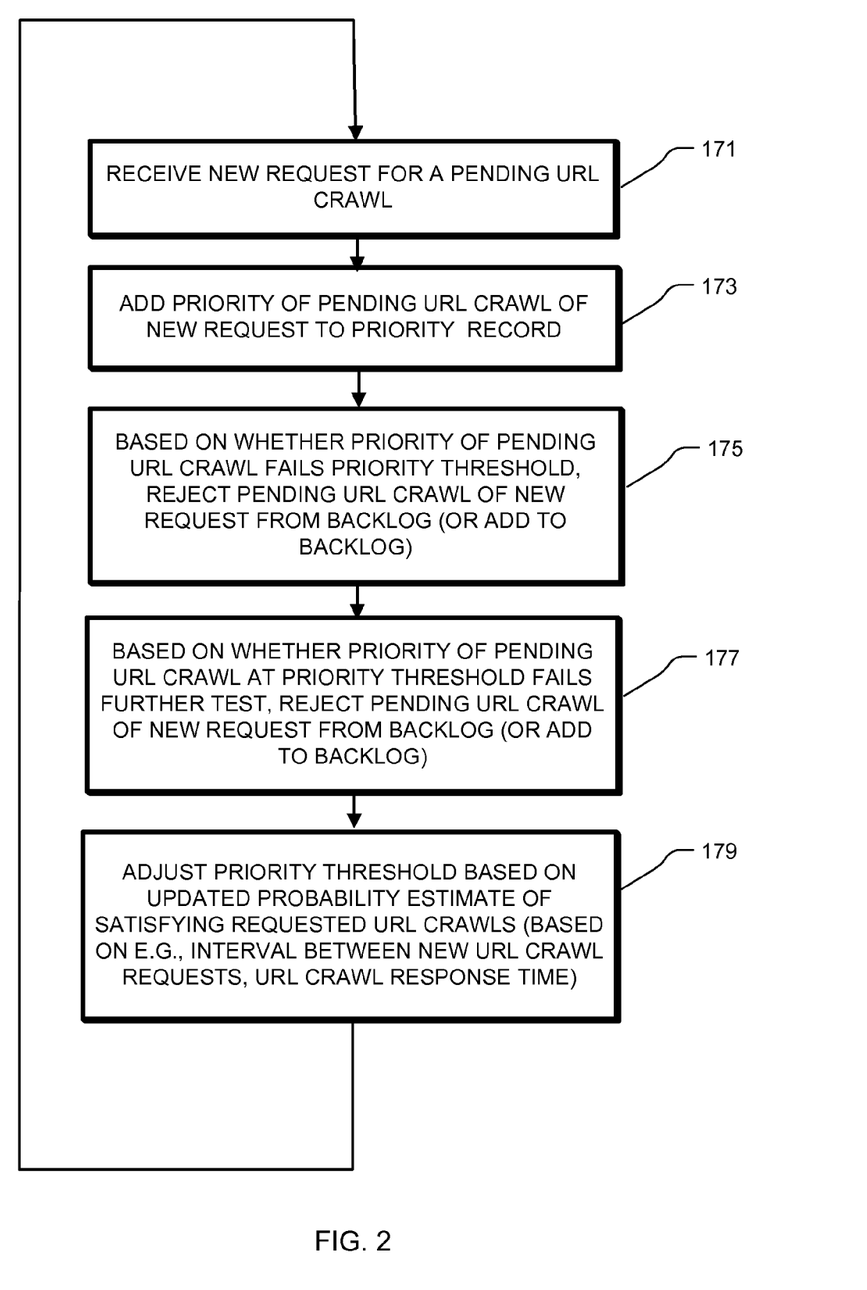
FIG. 2 is a simplified flowchart of an example process flow of rejecting pending URL crawls from the backlog of pending URL crawls.

FIG. 2 is a simplified flowchart of an example process flow of rejecting pending URL crawls from the backlog of pending URL crawls. In this example flow, early rejection from the backlog, combined with performing the highest priority pending URL crawl requests, help ensure that low latency URL crawls are performed for the most important URL crawl requests.

Selected features of the pending URL crawl rejection are shown in this process flow. As this process flow continues, pending URL crawls that are waiting in the backlog are selected for performing URL crawls and removed from the backlog. Other pending URL crawls are removed from the backlog after timing out, having waited in the backlog beyond a maximum waiting period (i.e. timeout or rejection time). This timeout or rejection time is set at the backlog manager.

In 171, a new request for a pending URL crawl from the applications 130 is received by the URL crawler and backlog manager 120. In 173, the priority of the pending URL crawl of the new request is added to the priority record of the URL crawler and backlog manager 120. In 175, the priority of the pending URL crawl is compared to the priority threshold. The pending URL crawl is rejected from the backlog if the priority of the pending URL crawl fails the priority threshold. The pending URL crawl is added to the backlog if the priority of the pending URL crawl passes the priority threshold.

Some requested URL crawls have a priority which does not fail the priority threshold outright but are failed upon further testing. When the priority of the pending URL crawl requests equals the priority threshold, then the priority may not fail outright. In 177, the priority of the pending URL crawl is further tested. The pending URL crawl is rejected from the backlog if the priority of the pending URL crawl fails the further testing. The pending URL crawl is rejected from the backlog if the priority of the pending URL crawl passes the further testing.

Further testing is performed by determining a failure rate of requested URL crawls having a priority that equals the priority threshold. This failure rate at the priority threshold is based on the fraction of pending URL crawls in the backlog that have priorities above the priority threshold. Priority values can be integer values or noninteger values. When these priority values have noninteger values, it is less likely that the priority of the pending URL crawl will equal the priority threshold. Priority values can adjust noninteger values into integer values with a rounding function, floor function, or ceiling function. The failure rate at priority threshold is updated periodically. Updates can occur once a minute, or some other period, or be event triggered.

The pending URL crawl is assigned a random number, such as with a range between 0 and 1. The requested URL crawl is rejected if the random number is less than the failure rate at the threshold priority. An alternative keeps another value, the cumulative fail at threshold priority. The cumulative fail value ranges from 0 to a limit such as 1. The cumulative fail value starts at 0, and is incremented by the failure rate at threshold priority whenever a requested URL crawl has a priority equal to the threshold priority. If the total cumulative fail value is less than its limit value of 1, the requested URL crawl is accepted in the backlog. If the total cumulative fail value is greater than or equal to its limit value of 1, the requested URL crawl is rejected from the backlog, and the limit value of 1 is subtracted from cumulative fail at threshold priority. In yet another alternative, if a requested URL crawl has a priority equal to the threshold priority, the requested URL crawl is accepted or rejected without resorting to the failure rate at threshold priority. A default rule can reject all requested URL crawls having a priority equal to the priority threshold from the backlog, accept all requested URL crawls having a priority equal to the priority threshold from the backlog, or a combination.

In 179, the priority threshold is adjusted, based on an updated probability estimate of satisfying requested URL crawls. This probability estimate is based on the estimated fraction of requested URL crawls that can be satisfied. The fraction of requested URL crawls that can be satisfied has as the numerator the average request interval, or the difference in arrival time between URL crawl requests.

The above process flow is exemplary, and can be modified in various embodiments. Alternative process flows include the above steps in every permutation, and for every permutation of every subcombination of steps varying from just one step to all of the steps. In further alternative process flows, further steps can be added; and steps can be divided, combined, modified, and/or rearranged in order.

The following example illustrates receipt of requests, occasional rejections, statistics used to determine whether to reject requests, and the resulting backlog of pending URL crawls and resulting record of priorities of pending URL crawls from time t=0 seconds to time t=4.1 seconds. The number N of priorities in the priority record is equal to 5, though other values can be used.

At time t=0 seconds:

An application requests a crawl of URL http://www.example.com/a.html with priority 500. The backlog manager inserts the pending URL crawl into the backlog of pending URL crawls, and inserts the corresponding priority into the record of priorities.

The backlog of pending URL crawls includes the following:
        {(http://www.example.com/a.html, 500)}
    Record of priorities requested URL crawls: [500]
    The average request interval and average response interval are initialized to 0.
    At time t=0.1 seconds:
    The backlog manager takes the highest priority pending URL crawl out of the backlog of pending URL crawls. The URL crawler sends the pending URL crawl to the network for crawl.
    The backlog of pending URL crawls is empty.
    Record of priorities of requested URL crawls: [500]
    At time t=0.5 seconds:
    An application requests a crawl of the URL http://www.example.com/b.html with priority 500.
    The backlog of pending URL crawls includes the following:
        {(http://www.example.com/b.html, 500)}
    Record of priorities of requested URL crawls: [500, 500]
    The average request interval is set to 500000 microseconds, the difference between the last and current request times.
    At time t=0.8 seconds:
    An application requests a crawl of URL http://www.example.com/c.html with priority 100.
    The backlog of pending URL crawls includes the following:
        {(http://www.example.com/b.html, 500),
        (http://www.example.com/c.html, 100)}
    Record of priorities of requested URL crawls: [100, 500, 500]

$$\text{Average request interval} = (\text{new dataweight} * (\text{present time} - \text{time last request})) + ((1.0 - \text{new dataweight}) * (\text{old value of average request interval})) = 0.8 * (800000 - 500000) + 0.2 * 500000 = 340000$$

At time t=1.0 seconds:
    The first URL crawl returns from the network. Backlog of pending URL crawls and Record of priorities of requested URL crawls don't change. The average response interval is set to 1 second, the elapsed duration since the start.
    At time t=1.2 seconds:
    The backlog manager takes the highest priority pending URL crawl out of the backlog. The URL crawler sends the highest priority pending URL crawl to the network for crawl.
    The backlog of pending URL crawls includes the following:
        {(http://www.example.com/d.html, 200),
        (http://www.example.com/c.html, 100)}
    Record of priorities of requested URL crawls: [200, 100, 500, 500]
    At time t=1.5 seconds:
    An application requests a crawl of URL http://www.example.com/d.html with priority 200.
    The backlog of pending URL crawls includes the following:
        {(http://www.example.com/d.html, 200),
        (http://www.example.com/c.html, 100)}
    Record of priorities of requested URL crawls: [200, 100, 500, 500]

$$\text{Average request interval} = (\text{new dataweight} * (\text{present time} - \text{time last request})) + ((1.0 - \text{new dataweight}) * (\text{old value of average request interval})) = 0.8 * (1500000 - 800000) + 0.2 * 340000 = 628000$$

At time t=2.0 seconds:
    An application requests a crawl of URL http://www.example.com/e.html with priority 200.
    The backlog of pending URL crawls includes the following:
        {(http://www.example.com/e.html, 200),
        (http://www.example.com/d.html, 200),
        (http://www.example.com/c.html, 100)}
    Record of priorities of requested URL crawls: [200, 200, 100, 500, 500]

$$\text{Average request interval} = (\text{new dataweight} * (\text{present time} - \text{time last request})) + ((1.0 - \text{new dataweight}) * (\text{old value of average request interval})) = 0.8 * (2000000 - 1500000) + 0.2 * 628000 = 525600$$

At time t=2.1 seconds:
    The second URL crawl returns from the network. Backlog of pending URL crawls and Record of priorities of requested URL crawls don't change.

$$\text{Average response interval} = (\text{new dataweight} * (\text{present time} - \text{time last response})) + ((1.0 - \text{new dataweight}) * (\text{old value of average response interval})) = 0.8 * (2100000 - 1000000) + 0.2 * 1000000 = 1080000$$

At time t=2.3 seconds:
    The backlog manager takes the highest priority pending URL crawl out of the backlog of pending URL crawls and the URL crawler sends the highest priority pending URL crawl to the network for crawl.
    The backlog of pending URL crawls includes the following:
        {(http://www.example.com/d.html, 200),
        (http://www.example.com/c.html, 100)}
    Record of priorities of requested URL crawls: [200, 200, 100, 500, 500]
    At time t=2.5 seconds:
    An application requests a crawl of URL http://www.example.com/f.html with priority 600.
    The backlog of pending URL crawls includes the following:
        {(http://www.example.com/f.html, 600),
        (http://www.example.com/d.html, 200),
        (http://www.example.com/c.html, 100)}
    Record of priorities of requested URL crawls: [600, 200, 200, 100, 500]

$$\text{Average request interval} = (\text{new dataweight} * (\text{present time} - \text{time last request})) + ((1.0 - \text{new dataweight}) * (\text{old value of average request interval})) = 0.8 * (2500000 - 2000000) + 0.2 * 525600 = 505120$$

At time t=2.9 seconds:
    An application requests a crawl of URL http://www.example.com/g.html with priority 400.
    The backlog of pending URL crawls includes the following:
        {(http://www.example.com/f.html, 600),
        (http://www.example.com/g.html, 400),
        (http://www.example.com/d.html, 200),
        (http://www.example.com/c.html, 100)}
    Record of priorities of requested URL crawls: [400, 600, 200, 200, 100]

$$\text{Average request interval} = (\text{new dataweight} * (\text{present time} - \text{time last request})) + ((1.0 - \text{new dataweight}) * (\text{old value of average request interval})) = 0.8 * (2900000 - 2500000) + 0.2 * 505120 = 421024$$

At time t=3.0 seconds:
    The third URL crawl returns from the network. Backlog of pending URL crawls and Record of priorities of requested URL crawls don't change.

Average response interval=(new dataweight*(present_time−time last response))+((1.0−new dataweight)*(old value of average response interval))=0.8*(3000000−2100000)+0.2*1080000=936000

The backlog manager updates threshold priority and failure rate at threshold priority (or in this case, calculate them for the first time).

The estimated request success rate=average request interval/average response interval=421024/936000=0.4498

The sorted record of priorities: [100, 200, 200, 400, 600]

Priority record index $k=N*(1-$estimated request success rate$)-0.5=5*(1-0.4498)-0.5=2.25$, rounded to the integer value $k=2$.

The k-th priority element in the sorted record of priorities is the priority threshold. Because the priority record stores a priority value of 200 at index k=2, the priority threshold=200. The record indices start from 0, though the indices can begin from other index values.

Failure rate at threshold priority=(k+1−number of requests below priority threshold)/number of requests at priority threshold=(2+1−1)/2=1.0

Because failure rate at threshold priority is 1.0, all requested URL crawls with the priority equal to the priority threshold are rejected from the backlog.

At time t=3.1 seconds:
An application requests a crawl of URL http://www.example.com/h.html with priority 400. Since the priority is above the threshold, the backlog manager accepts the requested URL crawl into the backlog of pending URL crawls.
The backlog of pending URL crawls includes the following:
{(http://www.example.com/f.html, 600),
(http://www.example.com/h.html, 400),
(http://www.example.com/g.html, 400),
(http://www.example.com/d.html, 200),
(http://www.example.com/c.html, 100)}
Record of priorities of requested URL crawls: [400, 400, 600, 200, 200]

Average request interval=(new dataweight*(present time−time last request))+((1.0−new dataweight)*(old value of average request interval))=0.8*(3100000−2900000)+0.2*421024=244204

At time t=3.2 seconds:
The backlog manager takes the highest priority pending URL crawl out of the backlog of pending URL crawls and the URL crawler sends to the URL crawler the highest priority pending URL crawl out for crawl.
The backlog of pending URL crawls includes the following:
{(http://www.example.com/h.html, 400),
(http://www.example.com/g.html, 400),
(http://www.example.com/d.html, 200),
(http://www.example.com/c.html, 100)}
Record of priorities of requested URL crawls: [400, 400, 600, 200, 200]
At time t=3.6 seconds:
An application requests a crawl of URL http://www.example.com/i.html with priority 150. Since the priority is below the threshold, the backlog manager rejects the requested URL crawl from the backlog.
The backlog of pending URL crawls includes the following:
{(http://www.example.com/h.html, 400),
(http://www.example.com/g.html, 400),
(http://www.example.com/d.html, 200),
(http://www.example.com/c.html, 100)}
Record of priorities of requested URL crawls: [150, 400, 400, 600, 200]

Average request interval=(new dataweight*(present time−time last request))+((1.0−new dataweight)*(old value of average request interval))=0.8*(3600000−3100000)+0.2*244204=448840

At time t=3.9 seconds:
The fourth URL crawl returns from the network. Backlog of pending URL crawls and Record of priorities of requested URL crawls don't change.

Average response interval=(new dataweight*(present time−time last response))+((1.0−new dataweight)*(old value of average response interval))=0.8*(3900000−3000000)+0.2*936000=907200

At time t=4.0 seconds:
The backlog manager takes the highest priority pending URL crawl out of the backlog of pending URL crawls and the URL crawler sends the highest priority pending URL crawl out for crawl.
The backlog of pending URL crawls includes the following:
{(http://www.example.com/g.html, 400),
(http://www.example.com/d.html, 200),
(http://www.example.com/c.html, 100)}
Record of priorities of requested URL crawls: [150, 400, 400, 600, 200]
At time t=4.1 seconds:
An application requests a crawl of URL http://www.example.com/i.html with priority 150. Since the priority is below the threshold, the backlog manager rejects the requested URL crawl from the backlog.
The backlog of pending URL crawls includes the following:
{(http://www.example.com/g.html, 400),
(http://www.example.com/d.html, 200),
(http://www.example.com/c.html, 100)}
Record of priorities of requested URL crawls: [100, 150, 400, 400, 600]

Average request interval=(new dataweight*(present time−time last request))+((1.0−new dataweight)*(old value of average request interval))=0.8*(4100000−3600000)+0.2*448840=489768

Figure 3:
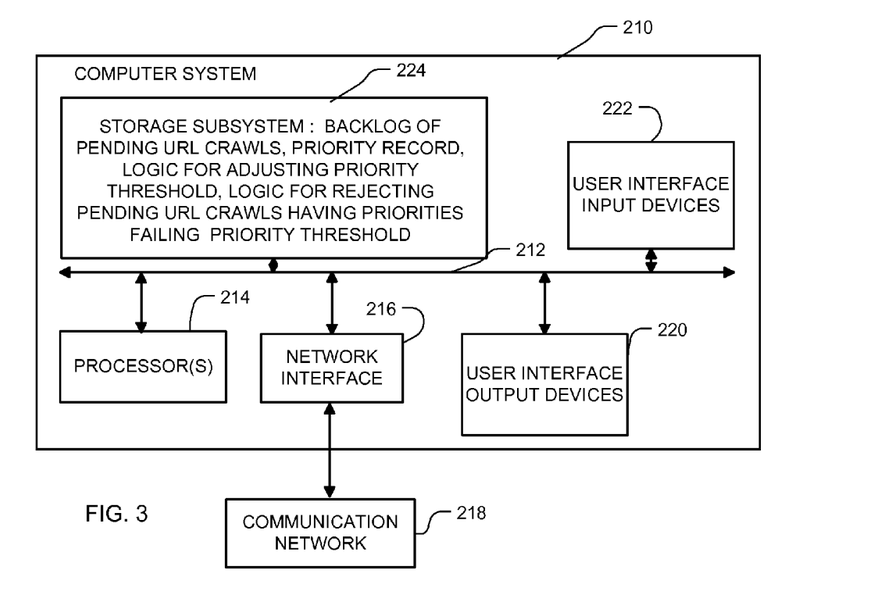
FIG. 3 is a simplified block diagram of a computer system configured for performing the rejection of pending URL crawls.

FIG. 3 is a simplified block diagram of a computer system 210 configured for performing the rejection of pending URL crawls. Computer system 210 typically includes at least one processor 214 which communicates with a number of peripheral devices via bus subsystem 212. These peripheral devices may include a storage subsystem 224, including for example memory devices and a file storage subsystem, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. Communication network 218 may include many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 210 or onto communication network 218.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 210 to the user or to another machine or computer system.

Storage subsystem 224 stores the basic programming and data constructs that provide the functionality of some or all of the tools described herein, including the logic for adjusting a priority threshold; logic for rejecting pending URL crawls having priorities failing the priority threshold; and the backlog of pending URL crawls and the record of priorities of pending URL crawls. These software modules are generally executed by processor 214 alone or in combination with other processors.

Memory used in the storage subsystem can include a number of memories including a main random access memory (RAM) for storage of instructions and data during program execution and a read only memory (ROM) in which fixed instructions are stored. A file storage subsystem can provide persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem in the storage subsystem 224, or in other machines accessible by the processor.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer system 210 can be of varying types including a personal computer, a portable computer, a workstation, a computer terminal, a network computer, a television, a mainframe, or any other data processing system or computing device. Due to the ever-changing nature of computers and networks, the description of computer system 210 depicted in FIG. 3 is intended only as a specific example for purposes of illustrating example embodiments. Many other configurations of computer system 210 are possible having more or less components than the computer system depicted in FIG. 3.

Figure 4:
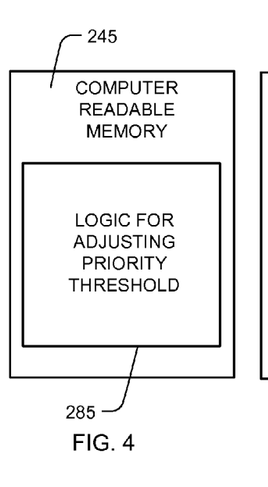
FIGS. 4-6 are simplified diagrams of computer readable memories storing, respectively, logic for adjusting a priority threshold; logic for rejecting pending URL crawls having priorities failing the priority threshold; and the backlog of pending URL crawls and the record of priorities of pending URL crawls.
Figure 5:
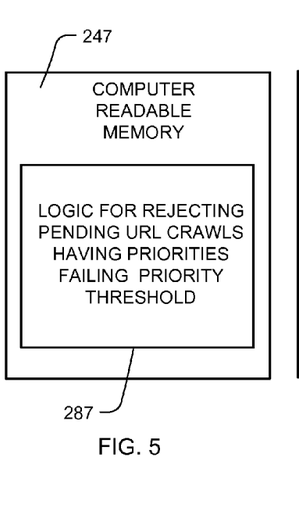
Figure 6:
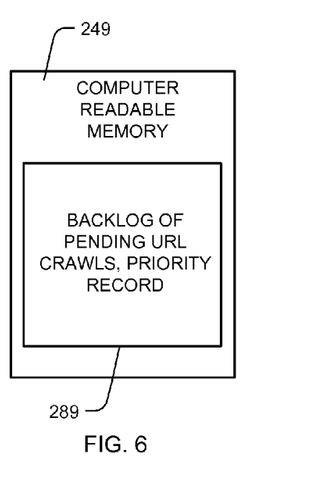

FIGS. 4-6 are simplified diagrams of computer readable memories storing, respectively, logic for adjusting a priority threshold; logic for rejecting pending URL crawls having priorities failing the priority threshold; and the backlog of pending URL crawls and the record of priorities of pending URL crawls.

FIG. 4 illustrates a product storing logic for adjusting a priority threshold 285 according to the technology described herein, in a computer readable memory 245. The memory 245 can include a medium for example associated with file storage subsystem 224, and/or with network interface subsystem 216, or can include a data storage medium in a separate device. The medium used for the computer readable memory 245 can be a non-transitory medium, such as a hard disk, a floppy disk, a CDROM, an integrated circuit memory device, an optical medium, and removable media cartridge. The logic 285 as described herein can also be embodied by data coded on a transitory medium, such as a radio communication channel.

FIG. 5 illustrates a product storing logic for rejecting pending URL crawls having priorities failing the priority threshold 287 according to the technology described herein, in a computer readable memory 247. The memory 247 can include a medium for example associated with file storage subsystem 224, and/or with network interface subsystem 216, or can include a data storage medium in a separate device. The medium used for the computer readable memory 247 can be a non-transitory medium, such as a hard disk, a floppy disk, a CDROM, an integrated circuit memory device, an optical medium, and removable media cartridge. The logic 287 as described herein can also be embodied by data coded on a transitory medium, such as a radio communication channel.

FIG. 6 illustrates a product storing the backlog of pending URL crawls and the record of priorities of pending URL crawls 289 according to the technology described herein, in a computer readable memory 249. The backlog data structure that stores the backlog may be a queue, FIFO or any of the other data structures mentioned above. The memory 249 can include a medium for example associated with file storage subsystem 224, and/or with network interface subsystem 216, or can include a data storage medium in a separate device. The medium used for the computer readable memory 249 can be a non-transitory medium, such as a hard disk, a floppy disk, a CDROM, an integrated circuit memory device, an optical medium, and removable media cartridge. The logic 289 as described herein can also be embodied by data coded on a transitory medium, such as a radio communication channel.

One aspect of the technology is a method of reducing a URL crawl backlog in view of a limited URL crawl capacity, for use on a computing device. The method includes the step of placing, into the backlog data structure, a first set of pending URL crawls having priorities passing a priority threshold from requests to perform URL crawls. The method includes the step of the computing device rejecting from the backlog data structure a second set of the pending URL crawls having priorities failing the priority threshold, such that the step of rejecting happens without the pending URL crawls in the second set being performed, and such that the step of rejecting happens without the pending URL crawls in the second set waiting in the backlog data structure until a rejection time. The rejection of a requested URL crawl from the backlog data structure can happen prior to accepting the requested URL crawl into the backlog data structure, or after accepting the requested URL crawl into the backlog data structure.

Another aspect of the technology is a computing device to reduce a URL crawl backlog in view of a limited URL crawl capacity. This aspect includes a processor and a memory, having instructions to perform the described method.

Yet another aspect of the technology is a non-transitory computer readable medium storing instructions executable by a computing device to perform the described method.

Various embodiments described below are applicable to the different aspects.

One embodiment further includes the step of identifying the priority threshold based on a changing plurality of priorities of pending URL crawls.

In some embodiments with the step of identifying, the priority threshold is based on at least one priority of historical pending URL crawls rejected from the backlog data structure without being performed and without waiting until a rejection time. Even if relatively low priority pending URL crawls are rejected from the backlog data structure, and thus never performed, the priority of such rejected historical pending URL crawls still provides information for a priority threshold against which subsequent pending URL crawls are judged for acceptance into, or rejection from, the backlog data structure of pending URL crawls.

In further embodiments with the step of identifying, the priority threshold is based on at least one priority of historical pending URL crawls that were performed and are no longer in the backlog data structure. Even if relatively high priority pending URL crawls have waited in the backlog data structure until actually being performed, and are thus no longer in the backlog data structure, the priority of such performed historical pending URL crawls still provides information for a priority threshold against which subsequent pending URL crawls are judged for acceptance into, or rejection from, the backlog data structure of pending URL crawls.

One embodiment further includes the step of storing priorities of the pending URL crawls in a record of the priorities of the pending URL crawls to be used to determine the priority threshold, regardless of whether the pending URL crawls are in the backlog data structure. As discussed above, despite the absence of the pending URL crawl from the backlog data structure (e.g., the pending URL crawls have been relatively high priority ones that waited in the backlog data structure until actually being performed, or the pending URL crawls have been relatively low priority ones that were rejected from the backlog data structure) does not necessarily render the priority of such pending URL crawls unimportant. The priority of such historical pending URL crawls absent from the backlog data structure still provides information for a priority threshold against which subsequent pending URL crawls are judged for acceptance into, or rejection from, the backlog data structure of pending URL crawls.

One embodiment further includes the step of sorting the backlog data structure of the pending URL crawls according to priorities of the pending URL crawls to determine a particular one of the pending URL crawls to be performed next. Given the limited crawl capacity, the highest priority crawl(s) in the backlog data structure are chosen to be performed.

One embodiment further includes the step of adjusting the priority threshold based on an estimate of a probability that newly requested URL crawls will be satisfied. In general, the more probable that requested URL crawls will be satisfied, the more relaxed the priority threshold, and the less probable that requested URL crawls will be satisfied, the stricter the priority threshold.

In some embodiments with the step of adjusting the priority threshold, the likelihood increases with a time interval between new URL crawl requests, and the likelihood increases with a throughput of performed URL crawls.

In some embodiments with the step of adjusting the priority threshold, responsive to the estimate exceeding a threshold probability that newly requested URL crawls will be satisfied, the priority threshold is sufficiently relaxed such that no newly requested URL crawls are rejected from the backlog data structure due to the priority threshold. This helps to encourage a bias towards keeping the available crawling capacity filled.

One embodiment further includes the step of the computing device rejecting from the backlog data structure, the pending URL crawls having priorities at the priority threshold, at a rate that increases with a number of the priorities failing the priority threshold.

While the present invention is disclosed by reference to the preferred embodiments and examples detailed above, it is understood that these examples are intended in an illustrative rather than in a limiting sense.

It is contemplated that modifications and combinations will readily occur to those skilled in the art, which modifications and combinations will be within the spirit of the invention and the scope of the following claims.

The invention claimed is:

1. A method of reducing a URL crawl backlog in view of a limited URL crawl capacity, for use with a URL crawler executed by a computing device, comprising:
   receiving a set of pending URL crawl requests at the URL crawler, each URL crawl request arriving with an assigned priority;
   placing, into a backlog data structure, a first sub-set of the set of pending URL crawl requests, the backlog data structure having an associated maximum wait time;
   rejecting from the backlog data structure a second sub-set of the set of pending URL crawl requests having priorities failing a priority threshold, such that said rejecting happens without the pending URL crawl requests in the second sub-set being performed, and such that said rejecting happens without the pending URL crawl requests in the second sub-set waiting in the backlog data structure until the maximum wait time; and
   adjusting the priority threshold based on an estimate of a probability that newly requested URL crawl requests will be satisfied.

2. The method of claim 1, further comprising:
   identifying the priority threshold based on a changing plurality of priorities of pending URL crawl requests.

3. The method of claim 1, further comprising:
   identifying the priority threshold based on at least one priority of historical pending URL crawl requests rejected from the backlog data structure without being performed and without waiting until the maximum wait time.

4. The method of claim 1, further comprising:
   identifying the priority threshold based on at least one priority of historical pending URL crawl requests that were performed and are no longer in the backlog data structure.

5. The method of claim 1, further comprising:
   storing the priorities of the pending URL crawl requests in a record of the priorities of the pending URL crawl requests, to be used to determine the priority threshold, regardless of whether the pending URL crawl requests are in the backlog data structure.

6. The method of claim 1, further comprising:
   sorting the URL crawl requests in the backlog data structure according to priority to determine a particular one of the pending URL crawl requests to be performed next.

7. The method of claim 1,
   wherein the probability increases with a time interval between new URL crawl requests, and
   wherein the probability increases with a throughput of performed URL crawls.

8. The method of claim 1,
   wherein responsive to the estimate exceeding a threshold probability that newly requested URL crawls will be satisfied, the priority threshold is sufficiently relaxed such that no newly requested URL crawls are rejected from the backlog data structure due to the priority threshold.

9. The method of claim 1, further comprising:
   the computing device rejecting from the backlog data structure, a third sub-set of the set of pending URL crawl requests having priorities at the priority threshold, at a rate that increases with a number of the priorities failing the priority threshold.

10. An apparatus to reduce a URL crawl backlog in view of a limited URL crawl capacity, comprising:
  a processor and memory, having instructions executable by the processor to perform:
  receiving a set of pending URL crawls at a URL crawler, each URL crawl request arriving with an assigned priority;
  placing, into a backlog data structure, a first sub-set of the set of pending URL crawl requests, the backlog data structure having an associated maximum wait time;
  rejecting from the backlog data structure a second sub-set of the set of pending URL crawl requests having priorities failing a priority threshold, such that said rejecting happens without the pending URL crawl requests in the second sub-set being performed, and such that said rejecting happens without the pending URL crawl requests in the second sub-set waiting in the backlog data structure until the maximum wait time; and
  adjusting the priority threshold based on an estimate of a probability that newly requested URL crawl requests will be satisfied.

11. The apparatus of claim 10, the processor and memory further including instructions executable by the processor to perform:
  identifying the priority threshold based on a changing plurality of priorities of pending URL crawl requests.

12. The apparatus of claim 10, the processor and memory further including instructions executable by the processor to perform:
  identifying the priority threshold based on at least one priority of historical pending URL crawl requests rejected from the backlog data structure without being performed and without waiting until the maximum wait time.

13. The apparatus of claim 10, the processor and memory further including instructions executable by the processor to perform:
  identifying the priority threshold based on at least one priority of historical pending URL crawl requests that were performed and are no longer in the backlog data structure.

14. The apparatus of claim 10, the processor and memory further including instructions executable by the processor to perform:
  storing priorities of the pending URL crawl requests in a record of the priorities of the pending URL crawl requests to be used to determine the priority threshold, regardless of whether the pending URL crawl requests are in the backlog data structure.

15. The apparatus of claim 10, the processor and memory further including instructions executable by the processor to perform:
  sorting the URL crawl requests in the backlog data structure according to priority to determine a particular one of the pending URL crawl requests to be performed next.

16. The apparatus of claim 10,
  wherein the probability increases with a time interval between new URL crawl requests, and
  wherein the probability increases with a throughput of performed URL crawls.

17. The apparatus of claim 10,
  wherein responsive to the estimate exceeding a threshold probability that newly requested URL crawls will be satisfied, the priority threshold is sufficiently relaxed such that no newly requested URL crawls are rejected from the backlog data structure due to the priority threshold.

18. The apparatus of claim 10, wherein the apparatus is a computing device and the processor and memory further including instructions executable by the processor to perform:
  the computing device rejecting from the backlog data structure, the pending URL crawl requests having priorities at the priority threshold, at a rate that increases with a number of the priorities failing the priority threshold.

19. A non-transitory computer-readable medium storing instructions reducing a URL crawl backlog in view of a limited URL crawl capacity, executable by a computing device to perform:
  receiving a set of pending URL crawl requests at a URL crawler, each URL crawl request arriving with an assigned priority;
  placing, into a backlog data structure, a first sub-set of the set of pending URL crawl requests, the backlog data structure having an associated maximum wait time;
  rejecting from the backlog data structure a second sub-set of the set of pending URL crawl requests, the second sub-set having priorities failing a priority threshold, such that said rejecting happens without the pending URL crawl requests in the second sub-set being performed, and such that said rejecting happens without the pending URL crawl requests in the second sub-set waiting in the backlog data structure until the maximum wait time; and
  adjusting the priority threshold based on an estimate of a probability that newly requested URL crawl requests will be satisfied.

20. The computer-readable medium of claim 19, wherein the instructions are executable by the computing device to further perform:
  rejecting from the backlog data structure the pending URL crawl requests having priorities at the priority threshold at a rate that increases with a number of the priorities failing the priority threshold.

21. The computer-readable medium of claim 19, wherein the instructions are executable by the computing device to further perform:
  storing priorities of the pending URL crawl requests in a record of the priorities of the pending URL crawl requests to be used to determine the priority threshold, regardless of whether the pending URL crawl requests are in the backlog data structure.

* * * * *